United States Patent
Conner (10) Patent No.: US 7,364,302 B2
(45) Date of Patent: Apr. 29, 2008

(54) PROJECTION DISPLAY SYSTEM USING MULTIPLE LIGHT SOURCES AND POLARIZING ELEMENT FOR USING WITH SAME

(75) Inventor: Arlie R. Conner, Portland, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 264 days.

(21) Appl. No.: 10/914,596

(22) Filed: Aug. 9, 2004

(65) Prior Publication Data
US 2006/0028620 A1    Feb. 9, 2006

(51) Int. Cl.
*G03B 21/14* (2006.01)
*G03B 21/26* (2006.01)
*G03B 21/28* (2006.01)
*G02F 1/1335* (2006.01)
*H04N 5/74* (2006.01)
*G02B 5/30* (2006.01)
*G02B 27/12* (2006.01)
*G02B 27/14* (2006.01)
*B60Q 1/00* (2006.01)

(52) U.S. Cl. ............................. 353/20; 353/31; 353/33; 353/37; 353/81; 353/84; 353/94; 349/9; 348/750; 348/758; 359/490; 359/495; 359/496; 359/636; 359/638; 359/640; 362/555; 362/231; 362/800

(58) Field of Classification Search .................. 353/20, 353/30, 31, 33, 34, 37, 81, 82, 84, 94, 98, 353/99, 102; 349/5, 7, 8, 9, 96, 106; 348/739, 348/742, 744, 750, 751, 757, 758, 771, 801; 359/483, 487, 488, 489, 490, 495, 496, 501, 359/502, 577, 583, 584, 589, 618, 629, 634, 359/636, 638–640; 362/612, 55, 84, 227, 362/230, 231, 800, 555

See application file for complete search history.

(56) References Cited

U.S. PATENT DOCUMENTS 5,517,340 A    5/1996    Doany et al.

(Continued)

FOREIGN PATENT DOCUMENTS

EP    1 130 451 A    9/2001

(Continued)

OTHER PUBLICATIONS

Motomura et al., P-49: Development of Six-Primary HDTV-Display System, Society for Information Display, May 2000, SID Digest.

(Continued)

*Primary Examiner*—Rochelle Blackman (57) ABSTRACT

An image projection system has two illumination beams of different colors. A first polarizing beamsplitter (PBS) has first and second input faces. Light of the first color is incident on the first input face and the light of the second color is incident on second input face. At least some of the light of the first color propagates from the first PBS to a first imager unit via a second PBS. The light of the second color propagates from the first PBS to a second imager unit via, in some embodiments, the second PBS and, in other embodiments, via a third PBS. One type of PBS includes a polarizing layer and a dichroic optical layer that is substantially transparent for light of the first color in a first polarization state and is substantially reflective for light of the second color in a polarization state orthogonal to the first polarization state.

54 Claims, 7 Drawing Sheets

U.S. PATENT DOCUMENTS

| | | |
|---|---|---|
| 5,863,125 A | 1/1999 | Doany |
| 5,921,650 A | 7/1999 | Doany et al. |
| 6,069,671 A | 5/2000 | Lee et al. |
| 6,247,816 B1 | 6/2001 | Cipolla et al. |
| 6,280,034 B1 | 8/2001 | Brennescholtz |
| 6,318,863 B1 | 11/2001 | Tiao et al. |
| 6,388,718 B1 | 5/2002 | Yoo et al. |
| 6,547,400 B1 | 4/2003 | Yokoyama |
| 2002/0027619 A1* | 3/2002 | Robinson et al. ............. 349/9 |
| 2002/0105619 A1 | 8/2002 | Lin |
| 2002/0196413 A1 | 12/2002 | Kwok et al. |
| 2003/0048423 A1* | 3/2003 | Aastuen et al. ............. 353/31 |
| 2003/0107809 A1* | 6/2003 | Chen et al. ................ 359/498 |
| 2003/0117591 A1 | 6/2003 | Stanton |
| 2003/0117595 A1* | 6/2003 | Li et al. ..................... 353/31 |
| 2003/0147051 A1 | 8/2003 | Fujita et al. |
| 2004/0189949 A1 | 9/2004 | Ikeda et al. |

FOREIGN PATENT DOCUMENTS

| | | |
|---|---|---|
| JP | 03-201695 | 9/1991 |
| WO | WO 02/04994 | 1/2002 |

OTHER PUBLICATIONS

Motomura et al., Backward Model for Multi-Prirmary Display Using Linear Interpolation on Equi-luminance Plan, Feb. 2000, SID Tenth Color Imaging Conference.

* cited by examiner

PROJECTION DISPLAY SYSTEM USING MULTIPLE LIGHT SOURCES AND POLARIZING ELEMENT FOR USING WITH SAME

FIELD OF THE INVENTION

The present invention is directed generally to systems for displaying information, and more particularly to projection systems using devices imposing an image on a light beam and to polarizing beamsplitters.

BACKGROUND

Many optical projection systems include a transmissive or a reflective imager, also referred to as a light valve or light valve array, which imposes an image on a light beam. Transmissive light valves are typically translucent and allow light to pass through. Reflective imagers, on the other hand, reflectively modulate only selected portions of the input beam to form an image. Reflective imagers provide important advantages, as controlling circuitry may be placed behind the reflective surface and more advanced integrated circuit technology becomes available when the substrate materials are not limited by their opaqueness. New potentially inexpensive and compact liquid crystal display (LCD) projector configurations may become possible by the use of reflective liquid crystal microdisplays as the imager.

Many reflective LCD imagers, such as liquid crystal on silicon (LCoS) imagers rotate the polarization of incident light. In other words, polarized light is reflected by the imager either with its polarization state substantially unmodified for the darkest state, or with a degree of polarization rotation imparted to provide a desired grey scale. A 90° rotation provides the brightest state in these systems. Accordingly, a polarized light beam is generally used as the input beam for reflective LCD imagers. Some existing arrangements include a folded light path between a polarizing beamsplitter (PBS) and the imager, wherein the illuminating beam and the projected image reflected from the imager share the same physical space between the PBS and the imager. The PBS separates the incoming light from the polarization-rotated image light. Typically, a single imager may be used for forming a monochromatic image or for forming a color image through the sequential application of light in different color bands to the image, commonly referred to as "field sequential color".

Multiple imagers may also be used for forming a color image, in which case the illuminating light is split into multiple beams of different color. An image is imposed on each of the beams individually, which are then recombined to form a full color image. A multiple imager system requires that the alignment is able to withstand mechanical and thermal stresses. It is desirable to use as much light generated by the light source as possible. It is also desirable for the projection engine to be inexpensive and to have reduced thermal and mechanical instabilities.

SUMMARY OF THE INVENTION

One exemplary embodiment of the invention is directed to a projection system that includes a first light source to generate first light having a first spectrum, and a second light source to generate second light having a second spectrum different from the first spectrum. A projection core includes a first polarizing beamsplitter (PBS) having first and second input faces, at least a second PBS, and at least a first imager unit. The first light is incident on the first input face of the first PBS and the second light is incident on second input face of the first PBS. At least some of the first light propagates from the first PBS to the first imager unit via the second PBS.

Another exemplary embodiment of the invention is directed to a projection core, which includes a first PBS disposed to receive a first illumination light beam through a first input face and to receive a second illumination light beam through a second input face different from the first input face. A second PBS is disposed to receive light from the first illumination light beam after passing out of the first PBS and light from the second illumination light beam after passing out of the first PBS. A first imager and a second imager are disposed proximate respective first and second output faces of the second PBS. The second PBS reflects light from the first illumination light beam to the first imager through the first output face and transmits light from the second illumination light beam to the second imager through the second output face.

Another exemplary embodiment of the invention is directed to a polarizing beamsplitter that includes first and second prisms having respective first and second inner surfaces, the first and second inner surfaces being disposed facing each other, and a polarization beamsplitting film disposed between the first and second inner surfaces of the first and second prisms. A dichroic optical layer is disposed between the beamsplitting film and the second inner surface of the second prism. The dichroic optical layer is substantially transparent for light in a first polarization state and having a first spectrum and is substantially reflective for light in a second polarization state orthogonal to the first polarization state and having a second spectrum different from the first spectrum.

The above summary of the present invention is not intended to describe each illustrated exemplary embodiment or every implementation of the present disclosure. The following figures and detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which.

While the invention is amenable to various modifications and alternative forms, specifics thereof have been shown by way of example in the drawings and will be described in detail. It should be understood, however, that the invention is not limited to the particular exemplary embodiments described herein. On the contrary, the intention is to cover all modifications, equivalents, and alternatives falling within the spirit and scope of the disclosure as defined by the appended claims.

DETAILED DESCRIPTION

The present disclosure is applicable to projection systems using imagers and is particularly applicable to optical imager systems that produce high contrast, high brightness images.

Many liquid crystal (LC)-based displays operate well when the light input to the imager is linearly polarized with an acceptable extinction ratio. The extinction ratio is defined as the ratio of the power of the light in the desired polarization state over the power of the light in the undesired polarization state. The acceptable value of the extinction ratio depends on the particular application. In some projection television applications, for example, an acceptable extinction ratio may be 300:1 or higher. Most light sources, including ultra high pressure (UHP) lamps or light emitting diodes (LEDs), produce light that is not polarized, usually resulting in the use of a prepolarizer to achieve a desired level of polarization in the incident light.

A polarizing beamsplitter (PBS) may be used as the prepolarizer. Different types of PBS are available as a prepolarizer. One type is the MacNeille polarizer, which separates an incident unpolarized light beam into two polarized light beams via an interaction between the incident light and several dielectric layers disposed at Brewster's angle to the light beam. This type of PBS, however, is typically limited to use with illumination systems of f-number above about f/2.5, since the wider cone angle of lower f-number light results in a significant fraction of the light being incident on the layers at angles other than Brewster's angle. Consequently, in such exemplary embodiments, the polarizing efficiency is reduced when fast (low f-number) illumination systems are used.

A Cartesian PBS, on the other hand can handle illumination with low f-number light, for example f/2 or less, and is becoming increasingly widely used in projection systems. A Cartesian PBS is a PBS in which the polarization of separate beams is referenced to invariant, generally orthogonal, principal axes of the PBS itself. Examples of Cartesian PBSs include wire grid polarizers and multilayer optical film (MOF) reflective polarizing beamsplitters.

MOF PBSs include a film that is formed of alternating layers of different polymer material. If the plane of the film is considered to be the x-y plane, and the thickness of the film is measured in the z-direction, then the z-refractive index is the refractive index for light having an electric vector parallel to the z-direction. Likewise, the x-refractive index is the refractive index having its electric vector parallel to the x-direction and the y-refractive index is the refractive index for light having its electric vector parallel to the y-direction. The x-refractive index of one of the materials is the same as the x-refractive index of the other material, but there is a mismatch between the refractive indices of the two types of material in the y-refractive index. Where the layer thicknesses are chosen correctly, the film reflects visible light polarized in the y-direction and transmits light polarized in the x-direction.

One example of a MOF film is a matched z-index polarizer (MZIP) film, also referred to as a compensated polarizer film, in which the z-refractive index of the birefringent material is substantially the same as the x-refractive index. MZIP films have been described in U.S. Pat. Nos. 5,882,774 and 5,962,114, both of which are incorporated by reference. An improved type of MZIP film, having increased lifetime, uses PET/COPET-PCTG as the alternating layers, as is described in U.S. Pat. No. 6,609,795, incorporated herein by reference.

The present disclosure is directed especially to projection systems that have fewer components than three panel systems: such systems are less expensive and simpler to align than three panel systems. The projection systems also permit the use of different color light sources, which leads to more efficient use of illumination light than single panel systems that use a color filter to sequentially filter the light from a single light source. Exemplary projection systems according to the present disclosure use a PBS as a prepolarizer and also use one or more PBSs for coupling image light from reflective imagers. The PBSs used in the projection systems of the present disclosure may be, for example, Cartesian PBSs or MacNeille PBSs.

Different exemplary configurations of pre-polarizer are schematically illustrated in FIGS. 1A-1D. In the prepolarizer arrangement 100 illustrated in FIG. 1A, a first light beam 102 is directed through a first face 104 of the PBS 106, and a second light beam 108 is directed through a second face 110 of the PBS 106. In this particular arrangement 100, the light in the first light beam 102 is reflected by the PBS 106 through a first output face 112 as first polarized beam 114. The light in the second light beam 108 is also reflected by the PBS 106 through a second output face 116 as second polarized beam 118. Since both the first and second polarized beams 114 and 118 are reflected by the PBS 106, they are substantially s-polarized.

Figure 1A:
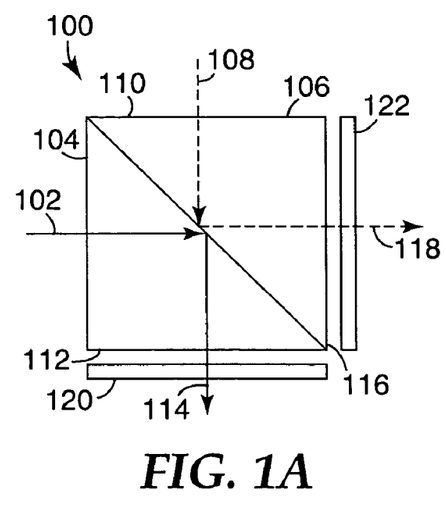
FIGS. 1A-1D schematically illustrate different pre-polarizer configurations according to principles of the present disclosure.

The spectral content of the first beam 102 may be different from the spectral content of the second light beam 108. For image projection systems, it is common to form images in different color bands, for example, blue, green and red color bands. The images in the different color bands are then combined, for example, in a beam combiner, on the projection screen or by integration on the viewer's retina so that the viewer perceives a full color image. In some exemplary embodiments, the first and second light beams 102 and 108, therefore, may each contain light in one or two of the blue, green and red color bands. In the following description of some exemplary embodiments of the present disclosure, the first light beam 102 contains green light and the second light beam 108 contains blue light and red light. It will be appreciated, however, that this is not a limitation of the invention and that the different light beams 102 and 108 may contain light of different color bands as well as different combinations of color bands.

Spectral filters 120 and 122 may be positioned in the polarized beams 114 and 118 to reduce spectral cross-talk between the polarized beams. For example, a green pass filter 120 may be disposed on the first polarized beam 114 to pass only green light and to block blue and/or red light. In a similar manner, the magenta pass filter 122 may be disposed on the second polarized beam 118 to pass only red light and blue light, and to block the passage of green light. The filters 120 and 122 may be dielectric filters, or any other suitable type of filter.

Figure 1B:
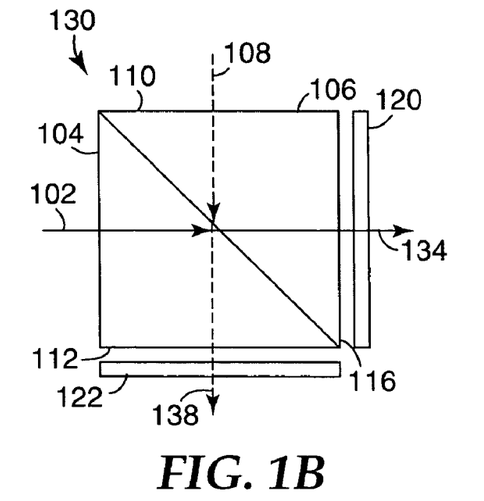

Another exemplary pre-polarizer arrangement 130 is shown in FIG. 1B, in which the first light beam 102 is transmitted through the PBS 106 as the first polarized light beam 134, and the second light beam 108 is transmitted through the PBS 106 as the second polarized light beam 138. In this case, since both the first and second polarized beams 134 and 138 are transmitted through the PBS 106, they are p-polarized. Spectral filters 120 and 122 may be used to prevent the passage of light of unwanted wavelengths in the polarized beams 134 and 138.

Polarization rotation elements, for example half-wave retardation plates may optionally be placed in the path of any of the polarized beams 114, 118, 134 and 138 so as to selectively control the polarization direction.

Figure 1C:
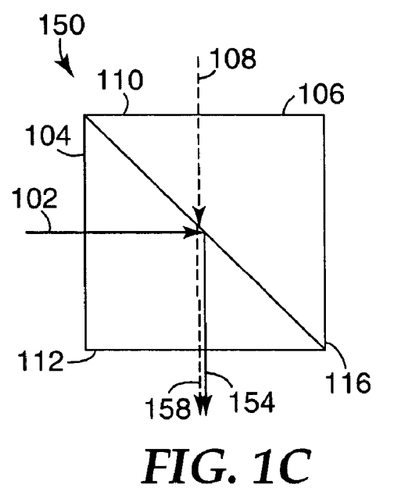

Another exemplary pre-polarizer arrangement 150 is schematically illustrated in FIG. 1C, in which the first light beam 102 is reflected by the PBS 106 as first polarized beam 154, while the second light beam 108 is transmitted through the PBS 106 as second polarized beam 158. Consequently, both the polarized beams 154 and 158 exit from the same face 112 of the PBS 106. However, the first polarized beam 154 is s-polarized while the second polarized beam 158 is p-polarized.

Figure 1D:
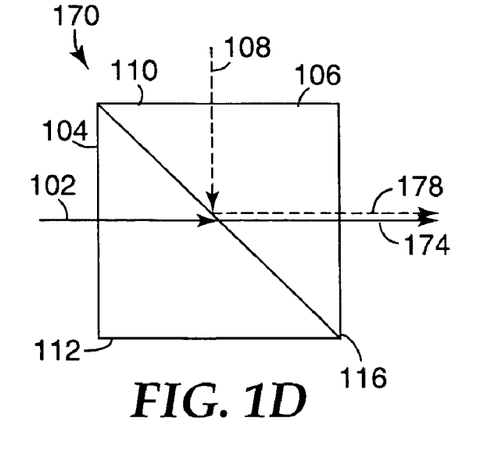

Another exemplary pre-polarizer arrangement 170 is schematically illustrated in FIG. 1D, in which the first light beam 102 is transmitted through the PBS 106 as first polarized beam 174, while the second light beam 108 is reflected by the PBS 106 as second polarized beam 178. Consequently, both the polarized beams 174 and 178 exit from the same face 116 of the PBS 106. However, the first polarized beam 174 is p-polarized while the second polarized beam 178 is s-polarized.

Figure 2A:
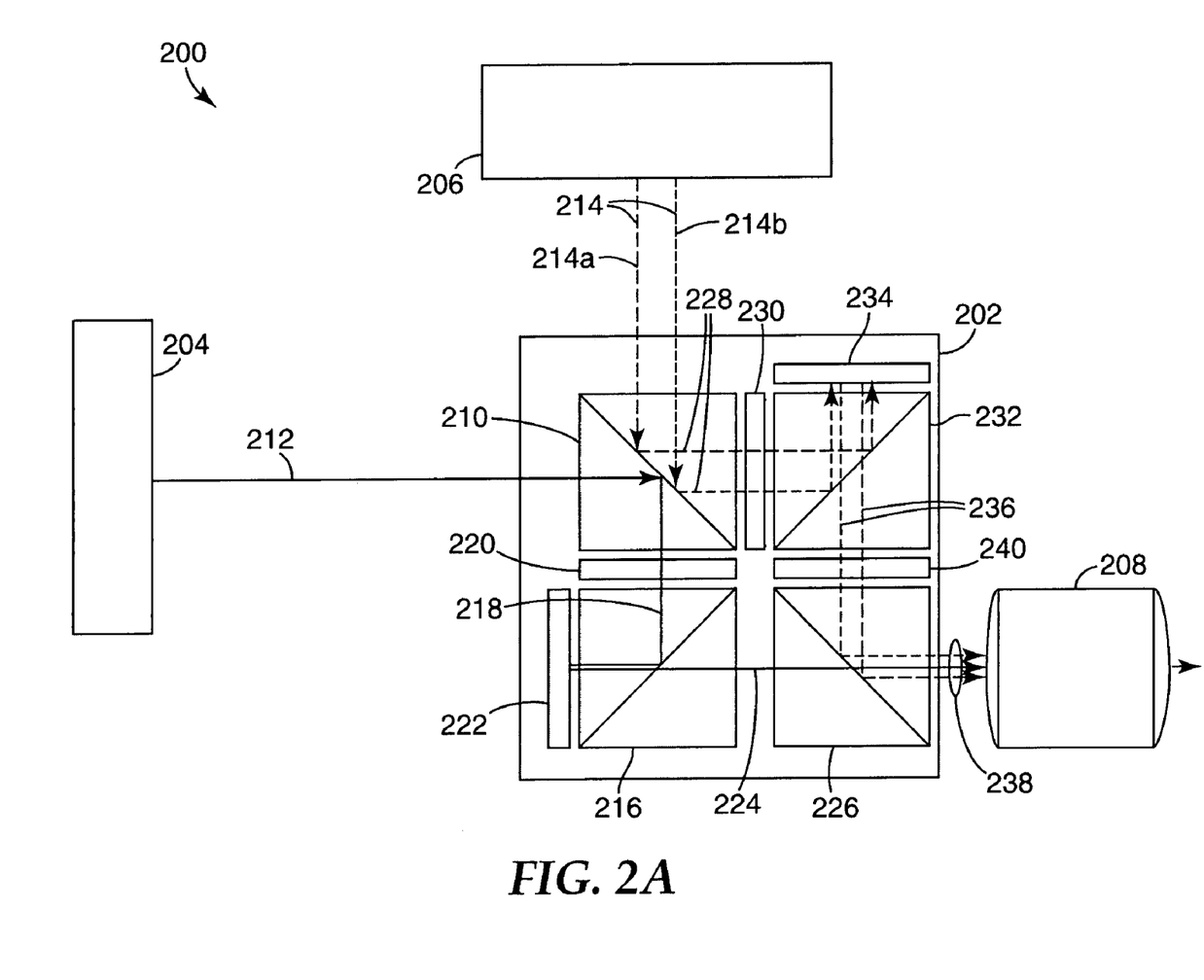
FIGS. 2A and 2B schematically illustrate different exemplary embodiments of a projection system according to principles of the present disclosure.

One example of a projection system 200 that uses the pre-polarizer configuration 100 is schematically illustrated in FIG. 2A. The projection system 200 includes a projection core 202, a first light source 204, a second light source 206 and a projection lens unit 208. The projection core 202 includes a prepolarizer 210 that prepolarizes light beams 212 and 214 from the first and second light sources 204 and 206 to form respective first and second polarized light beams 218 and 228. The first imager PBS 216 receives the first polarized light beam 218 from the prepolarizer 210. The first polarized light beam 218 may pass through a spectral filter 220 before entering the first imager PBS 216. Since the first polarized light beam 218 is s-polarized, the first polarized light beam 218 is reflected to the first imager unit 222. The first imager unit 222 imposes a polarization-modulated image on the first polarized light beam 218, with the result that a first image beam 224 is directed to a combiner 226. The combiner 226 may be a dichroic combiner.

The second light source 204 produces a light beam 214 comprising different color components, shown schematically as beams 214a and 214b. The component beams 214a and 214b are shown physically separated in the figure, but it will be appreciated that the component beams 214a and 214b substantially, if not completely, overlap spatially. The second polarized light beam 228 from the pre-polarizer 210 passes through the second spectral filter 230 to the second imager PBS 232. Since the second polarized light beam 228 is s-polarized, it is reflected by the PBS 232 to the second imager 234. The second imager 234 polarization modulates the light beam 228 to produce a second image beam 236 that passes through the second imager PBS 232 to the combiner 226. The first and second image beams 224 and 236 are combined at the combiner 226 and directed to the projection lens unit 208 as a combined image beam 238.

An optional polarization control element 240, for example a half-wave retarder, may be positioned between the second imager PBS 232 and the combiner 226 to change the polarization state of the second image beam 236 after passing out of the second imager PBS 232. Some dichroic combiners have higher reflectivity for s-polarized light, and so the polarization control element 240 may be used to convert the second image beam 236 to s-polarization incident on the combiner 226.

Figure 2B:
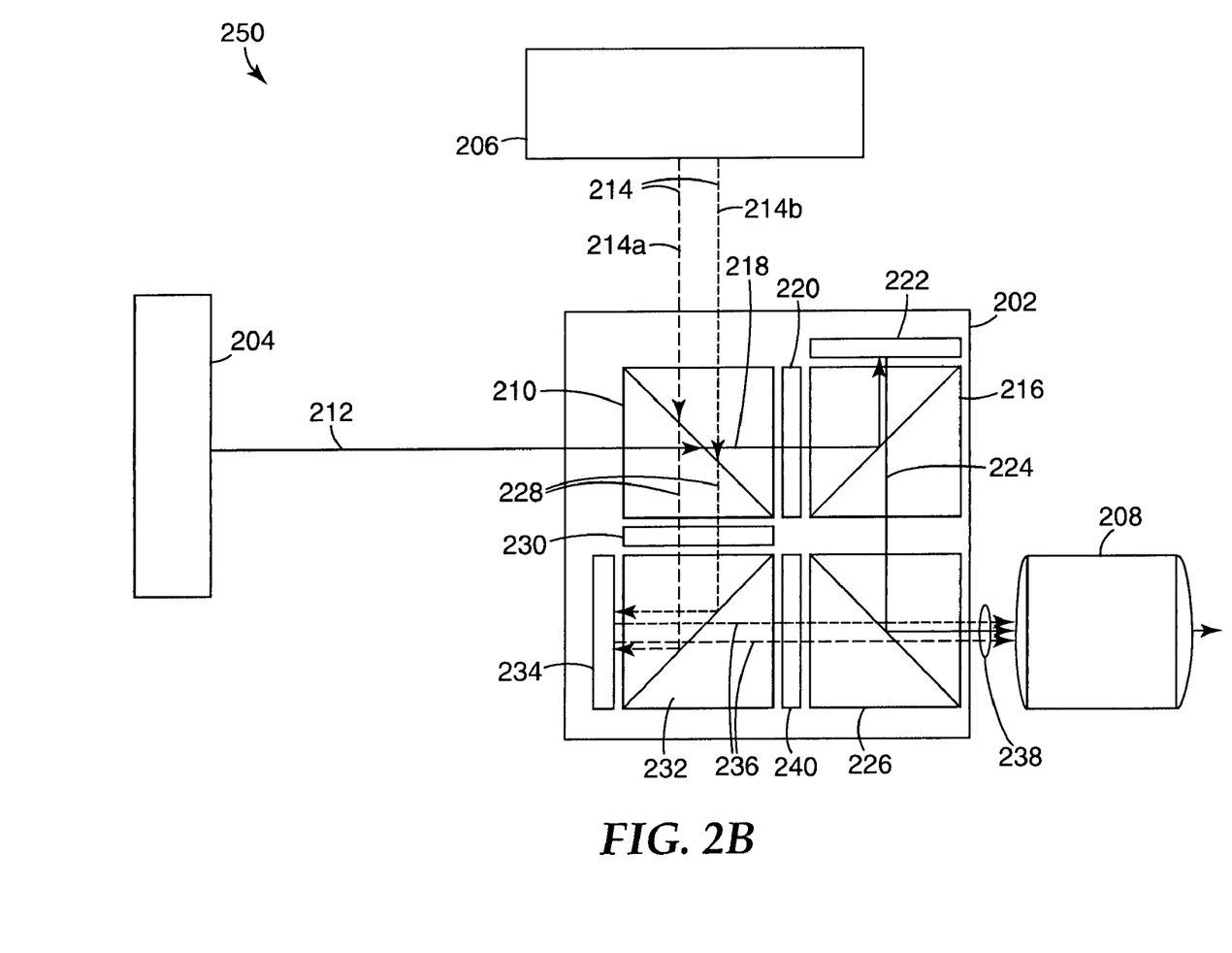

Another example of a projection system 250 is schematically illustrated in FIG. 2B. The projection system uses the prepolarizer configuration 130. As a result, the first polarized beam 218 is p-polarized, and is transmitted through the prepolarizer 210 to the first imager PBS 216. The second polarized beam, 228 is transmitted through the prepolarizer 210, also as a p-polarized beam, to the second imager PBS 232. In this exemplary embodiment, the filters 220 and 230 may also include polarization rotators to rotate the polarization of light through an angle of about 90°.

The light sources 204 and 206 preferably produce light having different spectral content. For example, the first light source 204 may produce green light and the second light source 206 may produce blue and red light. The mixture of blue and red light may be referred to as magenta light. In a preferred embodiment, the light sources 204 and 206 use light emitting diodes (LEDs) to generate the light. The first light source 204 may therefore be an illumination module that produces green light from green-emitting LEDs, while the second light source 206 produces blue light from blue-emitting LEDs and red light from red-emitting LEDs. When light is generated in separate color bands, there is no need to implement a color separation system or to filter the light for field-sequential modulation. Instead, where the second light source produces red and blue light separately, the red and blue LEDs can be directly modulated to provide light of a single color to the second imager unit at any one time. Thus, while the first imager may be illuminated with green light continuously, or quasi-continuously, the second imager may be illuminated with red and blue light consecutively. This permits the red and blue portions of the image to be generated at different times, with the second imager synchronized according to color of the light incident from the second light source 206. The sequential red and blue images, overlapped by the continuous, or quasi-continuous, green image, are integrated by the viewer's eyes to see a full color image.

Figure 3A:
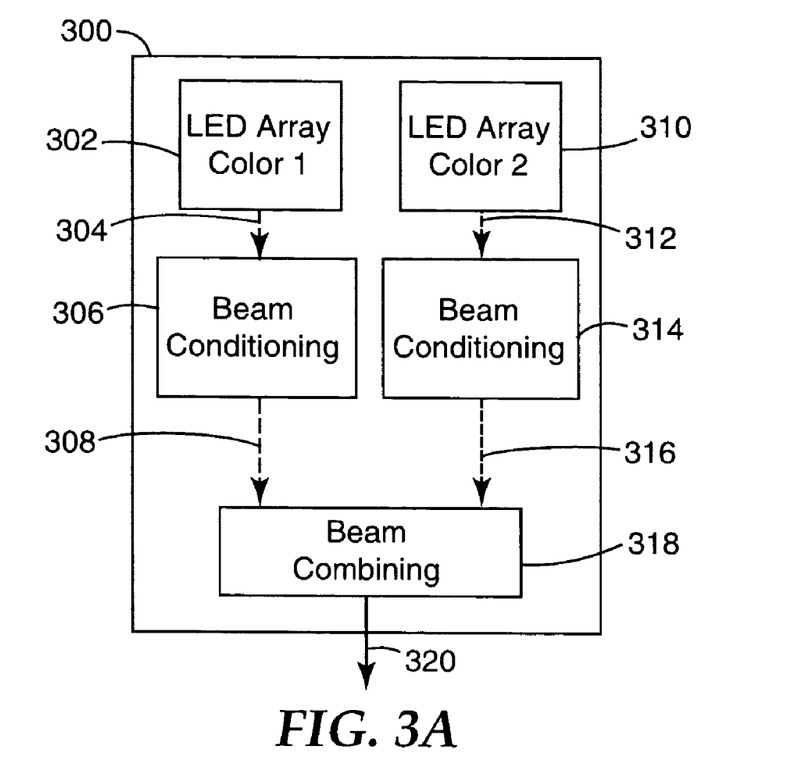
FIGS. 3A and 3B provide block schematics of different types of illumination sources.
Figure 3B:
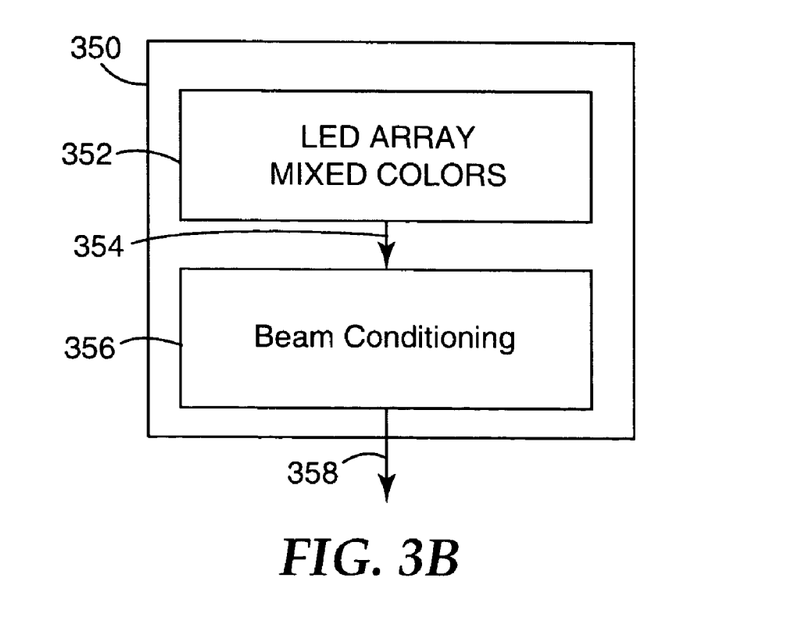

Schematic views of dual wavelength light sources are illustrated in FIGS. 3A and 3B. In the embodiment illustrated in FIG. 3A, the light source 300 employs a number of LEDs 302 that emit a light of first color, for example blue light 304. The first color light 304 is conditioned by the first conditioning optics 306 to produce a conditioned beam 308 of the first color. The conditioning optics may include any type of optical elements that change the characteristics of the light beam in any way, for example, to make the light emitted from the LEDs better suited to illuminating the imager. For example, the conditioning optics 306 may affect the divergence, intensity profile, shape or direction of the light beam. The conditioning optics may include, for example, refractive components such as lenses, or reflective components, such as mirrors, to collect the light emitted by the LEDS into at least partially collimated beams. Other approaches to collecting the light emitted from an LED may include the use of non-imaging light concentrators, integration tunnels and the like. Various combinations of refractive, reflective and/or non-imaging components may also be used in beam conditioning systems. Different types of LED-based light sources that employ different types of conditioning optics are discussed at greater length in, for example, commonly owned U.S. patent applications having Ser. Nos. 10/701,201, 10/745,000, and 10/845,677. For example, U.S.

application Ser. No. 10/701,201 describes an illumination unit that employs a plurality of LEDs, the light from each LED being collected and focused to a target area by a respective reflector. The respective reflectors may be integrated in a single reflector unit, and oriented so that the light from each reflector is directed to the target area.

In some exemplary embodiments, the light source 300 may employ a number of LEDs 310 that emit light 312 in a second color, different from the first color, for example red light. The second color light 312 may also be conditioned using a second set of conditioning optics 314 to produce a conditioned beam 316 of the second color. The two conditioned beams 308 and 316 may then be combined using beam combining optics 318 into a single beam 320 that contains light of both colors. The beams may be combined in any of a number of different ways, for example using a dichroic combiner. It should be noted that some beam conditioning may also take place after the differently colored light beams have been combined. For example, the beams may be combined before integration in a tunnel integrator, or after integration.

Another exemplary embodiment of a dual wavelength light source 350 is schematically illustrated in FIG. 3B. In this exemplary embodiment, an LED array 352 contains LEDs of both the first and second colors. Light 354 from the LED array 352 is conditioned by beam conditioning optics 356 to produce a dual color output beam 358.

The dual color output beams 320 and 358 may instantaneously contain both colors, or the LEDs producing the light of different colors may be controlled so as to emit only one of the colors into the output beams 320 and 358 at a particular time, or to emit the colors in a repeating sequence. In the description provided herein, a light beam that contains light of two different primary colors may be referred to as containing light having a color of the mixture of those two primary colors. This does not require, however, that the two primary colors be present simultaneously. For example, a light beam containing blue and red light may be referred to as a magenta light beam, even though the light beam need not contain both red light and blue light simultaneously but instead contains an alternating sequence of red and blue light.

Figure 4:
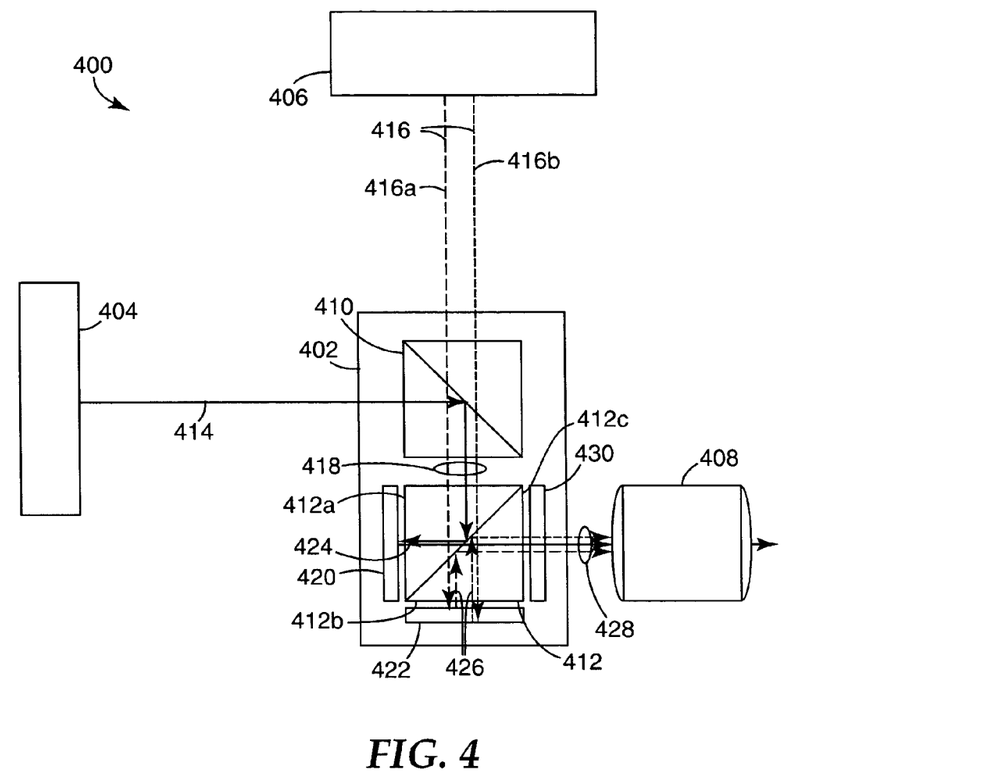
FIG. 4 schematically illustrates an exemplary embodiment of a projection system according to principles of the present disclosure.

Another exemplary embodiment of projection system 400 is schematically illustrated in FIG. 4. This exemplary projection system 400 includes two imager panels, but uses only two PBSs, a first PBS for prepolarizing and a second PBS for directing light to two imagers. The projection system includes a projection core 402, a first light source 404, a second light source 406 and a projection lens unit 408. The prepolarizer is arranged like the prepolarizer arrangement 150 schematically illustrated in FIG. 1C.

The projection core 402 has a prepolarizer PBS 410 and an imager PBS 412. Light 414 from the first light source 404 enters one face of the prepolarizer 410 and light 416 from the second light source 406 enters another face of the prepolarizer 410. The light 416 from the second source is shown as two beams 416a and 416b to indicate that the light from the second light source 406 comprises light of different colors, for example blue and red light. The red and blue light beams, however, may be at least substantially, if not completely, overlapped. In some exemplary embodiments, the light source 406 may be of the type of light source illustrated in FIG. 3A or FIG. 3B.

The prepolarizer 410 substantially reflects only s-polarized light from the first light beam 414 and substantially transmits only p-polarized light from the second light beam 416, in a combined polarized beam 418. The s-polarized component of the beam 418, originating at the first light source 404, is reflected within the PBS 412, and exits a first output face 412a of the PBS 412 to the first imager 420. The p-polarized component of the beam 418, originating at the second light source 406, is transmitted through the PBS 412, through a second output face 412b, to the second imager 422.

Polarization modulated image light 424 is reflected from the first imager 420 and is transmitted through the PBS 412 towards the projection lens unit 408. Also, polarization modulated image light 426 is reflected from the second imager 422 and is reflected by the PBS 412 towards the projection lens unit 408. The polarization modulated image light 424 and 426 from the two imagers 420 and 422 is combined into a single image beam 428 that exits through the image output face 412c of the PBS 412 and is projected by the projection lens unit 408 to a viewing screen.

The single image beam 428 that exits the PBS 412 contains primarily p-polarized green light and s-polarized magenta light. There may also be, however, a small component of p-polarized magenta light present in the image beam 428 as it exits the PBS 412. This is due to the fact that the PBS may reflect a small fraction of the unmodulated p-polarized light reflected by the imager 422. In a typical MZIP PBS the fraction of p-polarized light that is reflected, $R_p$ is about 2% or less. The contrast in the projected image may be increased by reducing the amount of the p-polarized magenta light in the image beam 428.

Several different ways of reducing the amount of p-polarized magenta light in the image beam 428 are available. One exemplary approach is to pass the image beam 428 through a clean-up optic 430. In some exemplary embodiments, the clean-up optic 430 contains two elements. The first element is a wavelength-selective polarization rotator that rotates the polarization of the green light through 90° but which does not rotate the polarization of the magenta light. Thus, the polarization of the green image light is rotated to s-polarization and is aligned with the magenta image light. The second element is a polarizer, for example a normal incidence reflective polarizer, which is aligned to transmit s-polarized light and block p-polarized light. The polarizer, therefore, passes the s-polarized green and magenta image light but blocks the p-polarized (non-image) magenta light.

An example of a suitable wavelength selective polarization rotator is a multilayer stack of retardation films that converts the polarization state of light in one spectral band to an orthogonal state, while leaving the polarization state of light outside that band essentially unchanged. Such filters may be obtained from ColorLink®, Boulder, Colo., under the trade name ColorSelect® filter. An example of a suitable normal incidence reflective polarizer is a multilayer dielectric reflective polarizer, such as Vikuiti-brand DBEF™ film, available from 3M Company, St. Paul, Minn.

Another approach includes rotating the polarization of the magenta light in the image beam 428, rather than the green light, prior to analyzing the light with a polarizer.

Figure 5A:
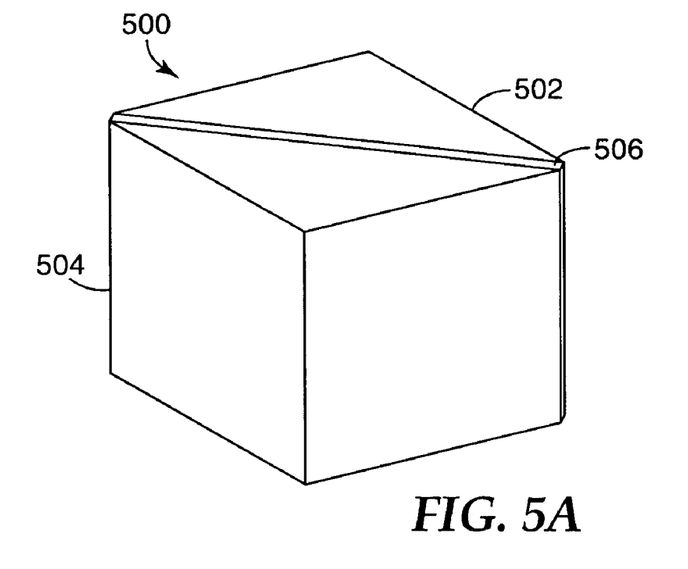
FIGS. 5A and 5B schematically illustrate an exemplary embodiment of a polarizing beamsplitter according to principles of the present disclosure.
Figure 5B:
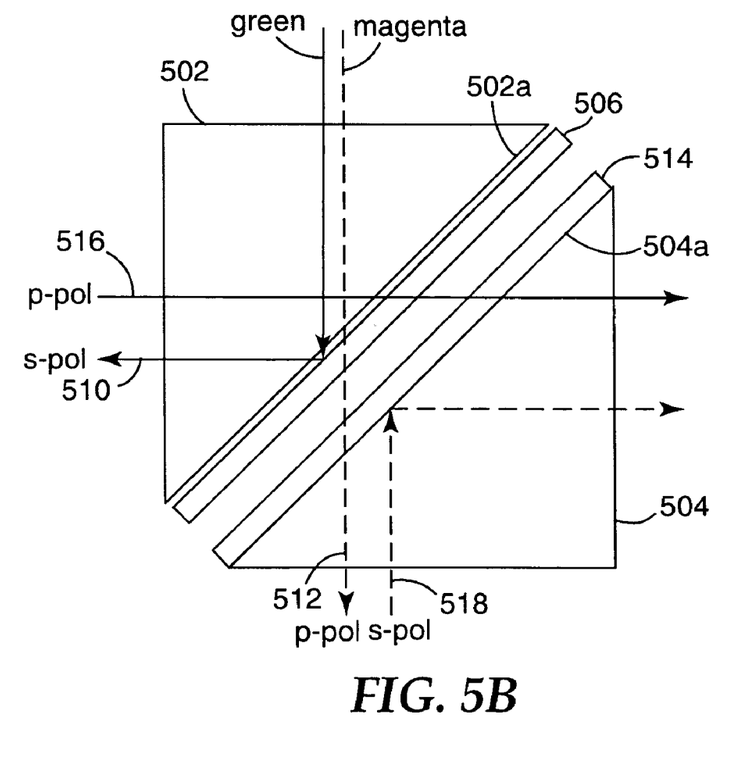

One particular exemplary embodiment of a PBS 412 used in the projection system 400 is now described with reference to FIGS. 5A and 5B. The PBS 412 is formed using two prisms 502 and 504, whose long surfaces 502a and 504a are facing each other. Where the prisms 502 and 504 are right angled prisms, the long surfaces 502a and 504a are hypotenuse surfaces. The long surfaces 502a and 504a define the gap between the prisms and may be said to be inner prism surfaces of the PBS. A polarization beamsplitting film 506 is disposed between the long surfaces 502a and 504a. The film 506 may be a MOF layer and preferably is an MZIP film.

The polarization beamsplitting film 506 splits incoming light by substantially reflecting s-polarized green light 510 and substantially transmitting p-polarized magenta light 512 propagating from the prepolarizer 410. The reflectivity of s-polarized light, $R_s$, over the visible region can be as high as about 99.5% or higher for MZIP film. Also, the transmission of p-polarized light, $T_p$ over the visible region can be over 98%. This means that a small fraction of s-polarized light is transmitted by the PBS 500 and a small fraction of p-polarized light is reflected by the PBS 500. Therefore, when illuminated with unpolarized light, the light reflected by the PBS 500 is not entirely s-polarized light, although a large portion of the reflected light is s-polarized. Likewise, when illuminated with unpolarized light, the light transmitted by the PBS 500 may not be entirely p-polarized light, although a large portion of the transmitted light is p-polarized.

Figure 6:
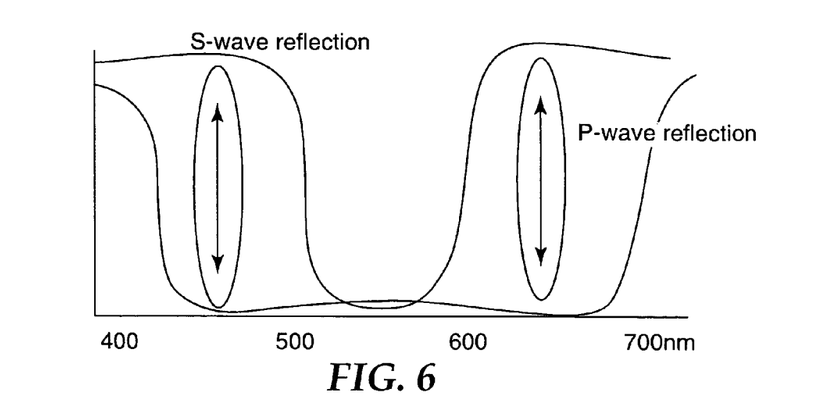
FIG. 6 provides a graph showing an example of the reflection spectrum of a dichroic layer in the polarizing beamsplitter of FIGS. 5A and 5B for orthogonal polarization states.

A dichroic layer 514 is also disposed between the long surfaces 502a and 504a. The dichroic layer 514 may be, for example, a dielectric stack deposited on the long surface 504a. The dichroic layer 514 has a reflection spectrum that is different for different polarization states, for example as illustrated in the exemplary embodiment shown in FIG. 6. The reflection for p-polarized light is close to zero over the visible spectrum. Thus, the p-polarized magenta light 512 passes through the dichroic layer 514, and the p-polarized green light 516 passes through the dichroic layer 514. The reflection for s-polarized light, on the other hand, is high in the blue region and in the red region of the visible spectrum, but is low in the green region of the spectrum. Thus, the magenta s-polarized light 518 is reflected by the dichroic layer 514 and is combined with the p-polarized green light 516.

Figure 7:
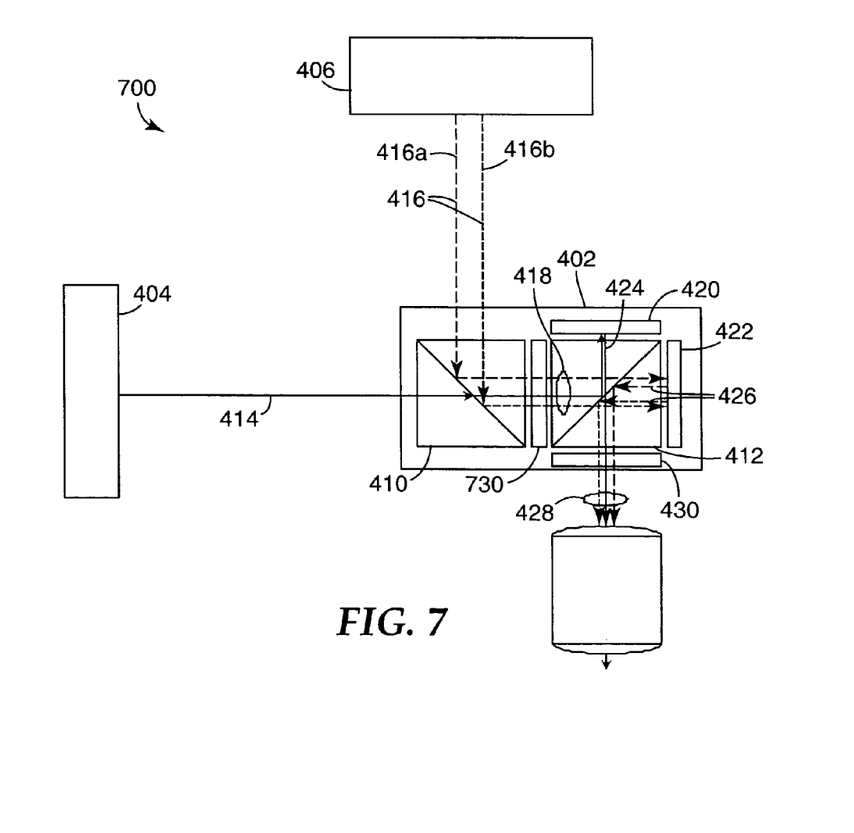
FIG. 7 schematically illustrates another exemplary embodiment of a projection system according to principles of the present disclosure.

Another exemplary embodiment of a projection system 700 that uses only two PBSs is schematically illustrated in FIG. 7. The projection system uses a prepolarizer arrangement like prepolarizer 170 schematically illustrated in FIG. 1D. In this embodiment, the light 414 from the first light source 404 is transmitted through the prepolarizer 410 to the second PBS 412 while the light 416 from the second light source 406 is reflected by the prepolarizer 410 to the second PBS. Furthermore, a polarization rotator 730, for example a half-wave retardation plate, may optionally be disposed between the prepolarizer 410 and the second PBS 412. The polarization rotator 730 converts the p-polarized light from the first light source 404 to s-polarized light that is reflected by the second PBS 412 to the first imager 420. Also, the polarization rotator converts the s-polarized light from the second light source 406 to p-polarized light that is transmitted through the second PBS 412.

Where there is no polarization rotator 730, the p-polarized light from the first light source 404 is incident on the second imager 422 and the s-polarized light from the second light source 406 is incident on the first imager 420. In such a case, the second PBS 412 may be provided with an appropriate dichroic layer, for example one that reflects s-polarized green light and transmits p-polarized magenta light.

As noted above, the present disclosure is related to display devices, and is believed to be particularly useful for inexpensive, high brightness, image projection systems. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A projection system, comprising:
   a first light source to generate first light having a first spectrum;
   a second light source to generate second light having a second spectrum different from the first spectrum; and
   a projection core, comprising
      a first polarizing beamsplitter (PBS) having first and second input faces,
      at least a second PBS, wherein the second PBS comprises,
         a polarization beamsplitting layer, and
         a dichroic optical layer being substantially transparent for light of the first spectrum in a first polarization state and being substantially reflective for light of the second spectrum in a second polarization state orthogonal to the first polarization state, and
      a first imager unit and a second imager unit, the projection core having no more than the first and second imager units, wherein the first light is incident on the first input face of the first PBS and the second light is incident on a second input face of the first PBS at least some of the first light propagates from the first PBS to the first imager unit via the second PBS.

2. A system as recited in claim 1, wherein the first spectrum comprises green light.

3. A system as recited in claim 1, wherein the second spectrum comprises blue light and red light.

4. A system as recited in claim 1, wherein the second spectrum comprises first and second portions, the second light source being capable of controlling amplitude of light in the first and second portions independently.

5. A system as recited in claim 1, wherein the first light source comprises at least one light emitting diode (LED).

6. A system as recited in claim 1, wherein the second light source comprises at least one LED.

7. A system as recited in claim 1, wherein the second light source comprises at least a first LED capable of emitting light in a first portion of the second spectrum and a second LED capable of emitting light in a second portion of the second spectrum different from the first portion.

8. A system as recited in claim 7, wherein the first portion comprises blue light and the second portion comprises red light.

9. A system as recited in claim 1, wherein the first imager unit is disposed proximate a first face of the second PBS, the second imager unit is disposed proximate a second face of the second PBS, and at least some of the second light propagates from the first PBS to the second imager unit via the second PBS.

10. A system as recited in claim 1, wherein the first PBS reflects at least some of the first light to the second PBS and the first PBS transmits at least some of the second light to the second PBS.

11. A system as recited in claim 1, wherein the first PBS transmits at least some of the first light to the second PBS and the first PBS reflects at least some of the second light to the second PBS.

12. A system as recited in claim 1, further comprising a projection lens unit disposed at an output side of the second PBS to project image light produced by the first and second imagers.

13. A system as recited in claim 12, further comprising a color compensating device disposed between the second PBS and the projection lens unit.

14. A system as recited in claim 1, wherein the second PBS further comprises first and second prisms having respective first and second inner surfaces, the first and second inner surfaces being disposed facing each other, and wherein the polarization beamsplitting layer is disposed between the first and second inner surfaces of the first and second prisms; and wherein the dichroic optical layer is disposed between the polarization beamsplitting layer and the second inner surface.

15. A system as recited in claim 1, wherein, the polarization beamsplitting layer is a Cartesian PBS.

16. A system as recited in claim 1, further comprising a third PBS at least some of the second light propagating from the first PBS to the second imager unit via the third PBS.

17. A system as recited in claim 16, wherein the second and third PBSs are Cartesian PBSs.

18. A system as recited in claim 16, wherein the first light is reflected by the first PBS to the second PBS and the second light is reflected by the first PBS to the third PBS.

19. A system as recited in claim 16, wherein the first light is transmitted through the first PBS to the second PBS and the second light is transmitted through the first PBS to the third PBS.

20. A system as recited in claim 16, further comprising a first filter disposed between the first PBS and the second PBS to block passage of the second light to the second PBS and a second filter disposed between the first PBS and the third PBS to block passage of the first light to the third PBS.

21. A system as recited in claim 16, further comprising a beam combiner disposed to combine image beams received from the second PBS and the third PBS to produce a combined image beam.

22. A system as recited in claim 21, further comprising a projection lens unit disposed to project the combined image beam.

23. A system as recited in claim 21, further comprising a polarization control element disposed between the third PBS and the beam combiner.

24. A system as recited in claim 1, further comprising a projection lens unit disposed to project an image received from the at least a first imager unit.

25. A system as recited in claim 1, wherein the first PBS is a Cartesian PBS.

26. A projection core, comprising:
a first polarizing beamsplitter (PBS) disposed to receive a first illumination light beam through a first input face and to receive a second illumination light beam through a second input face different from the first input face and;
a second PBS disposed to receive light from the first illumination light beam after passing out of the first PBS and light from the second illumination light beam after passing out of the first PBS, wherein the second PBS comprises,
a polarization beamsplitting layer, and
a dichroic optical layer being substantially reflective for light of one of the first illumination light beam or the second illumination light beam in the first polarization state and being substantially transparent for light of the other one of the first illumination light beam or the second illumination light beam in the second polarization state, and
only a first imager and a second imager, the first and second imagers being disposed, proximate respective first and second output faces of the second PBS, the second PBS reflecting light from the first illumination light beam to the first imager through the first output face and transmitting light from the second illumination light beam to the second imager through the second output face.

27. A projection core as recited in claim 26, wherein the first illumination light beam comprises light having a first spectrum and the second illumination light beam comprises light having a second spectrum different from the first spectrum.

28. A projection core as recited in claim 27, wherein the first spectrum comprises green light.

29. A projection core as recited in claim 27, wherein the second spectrum comprises at least one of blue light and red light.

30. A projection core as recited in claim 29, wherein the second spectrum comprises both blue light and red light.

31. A projection core as recited in claim 26, wherein the second PBS comprises an image output face different from the first and second output faces, image light from the first imager being transmitted through the second PBS and through the image output face and image light from the second imager being reflected within the second PBS.

32. A projection core it as recited in claim 31, further comprising a projection lens unit disposed to receive the image light from the first and second imagers after passing through the image output face.

33. A projection core as recited in claim 26, further comprising a first illumination light source disposed to direct the first illumination light beam to the first PBS and a second illumination light source disposed to direct the second illumination light beam to the first PBS.

34. A projection core as recited in claim 33, wherein the second light source comprises a first light emitter that emits light having a first wavelength in the second spectrum and second light emitter that emits light having a second wavelength in the second spectrum different from the first wavelength.

35. A projection core as recited in claim 34, wherein the first wavelength is a blue wavelength and the second wavelength is a red wavelength.

36. A projection core as recited in claim 26, wherein the first PBS and the polarization beamsplitting layer are Cartesian PBSs.

37. A polarizing beamsplitter, comprising:
first and second prisms having respective first and second inner surfaces, the first and second inner surfaces being disposed facing each other;
a polarization beamsplitting film disposed between the first and second inner surfaces of the first and second prisms; and
a dichroic optical layer disposed between the polarization beamsplitting film and the second inner surface of the second prism, the dichroic optical layer being substantially transparent for light in a first polarization state and having a first spectrum and being substantially reflective for light in a second polarization state orthogonal to the first polarization state and having a second spectrum different from the first spectrum.

38. A polarizing beamsplitter as recited in claim 37, wherein the first and second prisms comprise glass prisms.

39. A polarizing beamsplitter as recited in claim 37, wherein the polarization beamsplitting film is a Cartesian polarizing film.

40. A polarizing beamsplitter as recited in claim 37, wherein the polarization beamsplitting film is a multilayer optical film.

41. A polarizing beamsplitter as recited in claim 40, wherein the multilayer optical film is an MZIP film.

42. A polarizing beamsplitter as recited in claim 37, wherein the dichroic optical layer comprises a multilayer laminate of retardation films on the inner surface of the second prism.

43. A polarizing beamsplitter as recited in claim 37, wherein the first spectrum comprises green light.

44. A polarizing beamsplitter as recited in claim 37, wherein the second spectrum comprises at least one of i) red light and ii) blue light.

45. A polarizing beamsplitter as recited in claim 44, wherein the second spectrum comprises both red light and blue light.

46. A polarizing beamsplitter, comprising:
first and second prisms having respective first and second inner surfaces, the first and second inner surfaces being disposed facing each other;
a polarization beamsplitting film disposed between the first and second inner surfaces of the first and second prisms, wherein the polarization beamsplitting layer splits incoming light by substantially reflecting light in a first polarization state and substantially transmitting light in a second polarization state, the second polarization orthogonal to the first polarization; and
a dichroic optical layer disposed between the polarization beamsplitting film and the second inner surface of the second prism, the dichroic optical layer being substantially reflective for light in the first polarization state and having one of a first spectrum or a second spectrum and being substantially transparent for light in the second polarization state and having the other one of the first spectrum or the second spectrum, wherein the second spectrum is different from the first spectrum.

47. A polarizing beamsplitter as recited in claim 46, wherein the first and second prisms comprise glass prisms.

48. A polarizing beamsplitter as recited in claim 46, wherein the polarization beamsplitting film is a Cartesian polarizing film.

49. A polarizing beamsplitter as recited in claim 46, wherein the polarization beamsplitting film is a multilayer optical film.

50. A polarizing beamsplitter as recited in claim 49, wherein the multilayer optical film is an MZIP film.

51. A polarizing beamsplitter as recited in claim 46, wherein the dichroic optical layer comprises a multilayer laminate of retardation films on the inner surface of the second prism.

52. A polarizing beamsplitter as recited in claim 46, wherein the first spectrum comprises green light.

53. A polarizing beamsplitter as recited in claim 46, wherein the second spectrum comprises at least one of i) red light and ii) blue light.

54. A polarizing beamsplitter as recited in claim 53, wherein the second spectrum comprises both red light and blue light.

* * * * *

UNITED STATES PATENT AND TRADEMARK OFFICE
CERTIFICATE OF CORRECTION

PATENT NO. : 7,364,302 B2  
APPLICATION NO. : 10/914596  
DATED : April 29, 2008  
INVENTOR(S) : Arlie R. Conner Page 1 of 1

It is certified that error appears in the above-identified patent and that said Letters Patent is hereby corrected as shown below:

<u>Page 2 Col. 2 (Other Publications)</u>  
Line 1, delete "Multi-Prirmary" and insert -- Multi-Primary --, therefor.

<u>Column 11</u>  
Line 13, in Claim 15, delete "wherein," and insert -- wherein --, therefor.

Line 67, in Claim 26, delete "disposed," and insert -- disposed --, therefor.

<u>Column 12</u>  
Line 25 (approx.), in Claim 31, delete "PBS." and insert -- PBS to the image output face --, therefor.

Line 26 (approx.), in Claim 32, after "core" delete "it".

Signed and Sealed this

Ninth Day of June, 2009

JOHN DOLL  
*Acting Director of the United States Patent and Trademark Office*